US012770977B2

United States Patent

He et al.

(12) United States Patent
(10) Patent No.: US 12,770,977 B2
(45) Date of Patent: *Oct. 20, 2026

(54) BATTERY MODULE, POWER BATTERY PACK AND VEHICLE

(71) Applicant: BYD COMPANY LIMITED, Shenzhen (CN)

(72) Inventors: Kefeng He, Shenzhen (CN); Wenfeng Jiang, Shenzhen (CN); Xinyue Wang, Shenzhen (CN); Hui Zhang, Shenzhen (CN); Yan ZHu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 228 days.

This patent is subject to a terminal disclaimer.

(21) Appl. No.: 18/605,870

(22) Filed: Mar. 15, 2024

(65) Prior Publication Data

US 2024/0222796 A1 Jul. 4, 2024

Related U.S. Application Data

(63) Continuation of application No. 17/617,803, filed as application No. PCT/CN2019/092800 on Jun. 25, 2019.

(30) Foreign Application Priority Data

Jun. 21, 2019 (CN) ......................... 201920942577.2

(51) Int. Cl.
*H01M 50/474* (2021.01)
*H01M 10/0585* (2010.01)
(Continued)

(52) U.S. Cl.
CPC ..... *H01M 50/474* (2021.01); *H01M 10/0585* (2013.01); *H01M 10/653* (2015.04);
(Continued)

(58) Field of Classification Search
CPC .... H01M 50/50; H01M 50/51; H01M 50/474; H01M 50/24; H01M 50/249
See application file for complete search history.

(56) References Cited

U.S. PATENT DOCUMENTS

2002/0070704 A1* 6/2002 Abe .................... H01M 50/296 320/112
2004/0038122 A1* 2/2004 Hisamitsu ........... H01M 50/105 429/161
(Continued)

FOREIGN PATENT DOCUMENTS

CN 201766132 U 3/2011
CN 201853757 U 6/2011
(Continued)

OTHER PUBLICATIONS

Machine Translation of: JP 2004/071173 A, Matsushita, Mar. 4, 2004.*
(Continued)

*Primary Examiner* — Kenneth J Douyette
(74) *Attorney, Agent, or Firm* — Calfee, Halter & Griswold LLP

(57) ABSTRACT

A battery module, a power battery pack and a vehicle are provided. The battery module comprises n cells. At least two surfaces of the cell are respectively provided with a first positive terminal and a first negative terminal, and a second positive terminal and a second negative terminal. The n cells are arranged side by side in series. The cell (100) has a length L and a thickness T, where L meets 600 mm<L≤1300 mm, and L and T meet 23≤L/T≤200.

20 Claims, 4 Drawing Sheets

(51) Int. Cl.

| | |
|---|---|
| ***H01M 10/653*** | (2014.01) |
| ***H01M 50/24*** | (2021.01) |
| ***H01M 50/249*** | (2021.01) |
| ***H01M 50/477*** | (2021.01) |
| ***H01M 50/51*** | (2021.01) |
| ***H01M 50/533*** | (2021.01) |
| ***H01M 50/547*** | (2021.01) |

(52) U.S. Cl.

CPC ......... *H01M 50/24* (2021.01); *H01M 50/249* (2021.01); *H01M 50/477* (2021.01); *H01M 50/51* (2021.01); *H01M 50/533* (2021.01); *H01M 50/547* (2021.01)

(56) References Cited

U.S. PATENT DOCUMENTS

2006/0088761 A1* 4/2006 Ota ......................... B60L 58/21 429/162
2007/0141457 A1* 6/2007 Amagai .............. H01M 50/557 429/162
2012/0328934 A1* 12/2012 Watanabe ........... H01M 50/545 429/185
2017/0092986 A1 3/2017 Ogawa et al.

FOREIGN PATENT DOCUMENTS

| | | | | |
|---|---|---|---|---|
| CN | 202259540 | U | | 5/2012 |
| CN | 208272041 | U | | 12/2018 |
| CN | 208352420 | U | | 1/2019 |
| JP | 2004071173 | A | * | 3/2004 |
| JP | 2012054197 | A | | 3/2012 |
| WO | 2013019914 | A2 | | 2/2013 |

OTHER PUBLICATIONS

International Search Report of application No. PCT/CN2019/092800 dated Mar. 26, 2020.

* cited by examiner

BATTERY MODULE, POWER BATTERY PACK AND VEHICLE

CROSS-REFERENCE TO RELATED APPLICATIONS

This application is a continuation application of U.S. patent application Ser. No. 17/617,803, filed on Dec. 9, 2021, now U.S. Pat. No. 12,212,018, which is the national stage of International Application No. PCT/CN2019/092800, filed on Jun. 25, 2019, which claims to the priority of Chinese Patent No "201920942577.2" filed by the BYD Co., Ltd. on Jun. 21, 2019 and entitled "BATTERY MODULE, POWER BATTERY PACK AND VEHICLE", which are incorporated herein by reference in their entireties.

FIELD

This application relates to the technical field of vehicle manufacturing, and in particular to a battery module, a power battery pack having the battery module, and a vehicle having the power battery pack.

BACKGROUND

In recent years, with the rapid development of new energy vehicles, the performance requirements for on-board batteries also become higher accordingly. The Ministry of Industry and Information Technology, the National Development and Reform Commission, and the Ministry of Science and Technology jointly issued the "Medium and Long-term Development Plan for the Automobile Industry" to clarify the development goal of power batteries in China that by 2020, the specific energy of lithium-ion power battery cells will be greater than 300 Wh/kg, the specific energy of the system endeavors to reach 260 Wh/kg, the cost is less than 1 yuan/Wh, the use environment is from minus 30° ° C. to 55° ° C., and the battery has a 3 C charging capability; and the specific energy of the cells endeavors to reach 350 Wh/kg by 2025.

To achieve the above goals, the size or volume of the battery is increased to improve the battery capacity and the grouping efficiency of the entire battery pack, which is a major design direction at present. However, since the current is transmitted to a tab side through a current collector and then output through a tab, if the size of the battery is too large, the internal current collection path in an electrode plate of the battery is too long, and the internal resistance increases, which affects the high-rate charge and discharge performance and safety performance of the power battery.

SUMMARY

The present invention aims to at least solve one of the technical problems in the prior art. To this end, an object of this application is to propose a battery module that can reduce the internal resistance of the battery and improve the high-rate charge and discharge performance and safety performance of the battery.

The battery module according to an embodiment of this application includes n cells. The cell has a plurality of surfaces. One of at least two of the surfaces is provided with a first positive terminal and a first negative terminal. Another one of the at least two of the surfaces is provided with a second positive terminal and a second negative terminal. The n cells are arranged side by side in series. The first negative terminal of a (k−1)th cell is connected to the first positive terminal of a kth cell. The first negative terminal of the kth cell is connected to the first positive terminal of a (k+1)th cell. The second negative terminal of the (k−1)th cell is connected to the second positive terminal of the kth cell. The second negative terminal of the kth cell is connected to the second positive terminal of the (k+1)th cell, where $2 \le k \le n-1$ and $n \ge 3$.

The cell includes a core and has a length direction and a width direction perpendicular to the length direction. The core includes a positive electrode plate, an insulating separator, and a negative electrode plate stacked in sequence. Two ends of the positive electrode plate along the length direction are respectively electrically connected with a positive tab. Two ends of the negative electrode plate along the length direction are respectively electrically connected with a negative tab. At either end along the length direction, the positive tab and the negative tab are arranged to be staggered along the width direction.

In the battery module according to the embodiment of this application, each cell has at least two electrode terminal pairs each including a positive electrode terminal and a negative electrode terminal, and the at least two electrode terminal pairs can be both connected to the outside (other cells). Therefore, the internal resistance of the cell is reduced, bi-directional output is realized, the current flowing-through capacity of the cell is increased, and the side-by-side serial connection is achieved, to reduce the number of cells. The battery module includes a plurality of cells therein, and each cell is designed with multiple tabs for current output. This shortens the current collecting path inside the cell, reduces the internal resistance of the cell, and greatly improves the high-rate charge and discharge performance and safety performance of the cell.

This application also proposes a power battery pack.

The power battery pack according to an embodiment of this application includes a battery pack casing; and a plurality of cells as described in any of the foregoing embodiments, where the cells are mounted in the battery pack casing.

In the power battery pack according to an embodiment of this application, the battery pack casing is filled with a thermally conductive insulating layer encasing the battery module.

This application further proposes a vehicle.

The vehicle according to an embodiment of this application has a power battery pack according to any of the foregoing embodiments.

The vehicle, the power battery pack and the battery module have the same advantages over the prior art. and the details will not be repeated herein.

Additional aspects and advantages of this application are partially provided in the following description, and partially become apparent in the following description or understood through the practice of this application.

BRIEF DESCRIPTION OF THE DRAWINGS

The foregoing and/or additional aspects and advantages of this application will become obvious and easy to understand from the following descriptions of the embodiments with reference to the accompanying drawings, in which.

LIST OF REFERENCE NUMERALS

1000 battery module,
100 cell, 11 first positive terminal, 12 first negative terminal, 13 second positive terminal,
14 second negative terminal,
101 connecting piece,
100*a* core,
10 first sub-core, 110 first positive electrode plate, 120 insulating separator, 130 first negative electrode plate, 1101 first positive tab, 1301 first negative tab,
20 second sub-core, 210 second positive electrode plate, 220 insulating separator, 230 second negative electrode plate, 2101 second positive tab, 2301 second negative tab.

DETAILED DESCRIPTION

The following describes embodiments of this application in detail. Examples of the embodiments are shown in the accompanying drawings, and same or similar reference signs in all the accompanying drawings indicate same or similar components or components having same or similar functions. The embodiments described below with reference to the accompanying drawings are exemplary and used merely for explaining this application, and should not be construed as a limitation on this application.

A battery module 1000 according to an embodiment of this application is described with reference to FIGS. 1 to 4. A cell 100 in the battery module 1000 has at least two electrode terminal pairs each including a positive electrode terminal and a negative electrode terminal, and the at least two electrode terminal pairs can be both connected to the outside (other cells 100). Therefore, the current flowing-through capacity of the cell 100 is increased, bi-directional output is realized, the internal resistance of the cell 100 is reduced, and the side-by-side serial connection is achieved, to reduce the number of cells.

Figure 1:
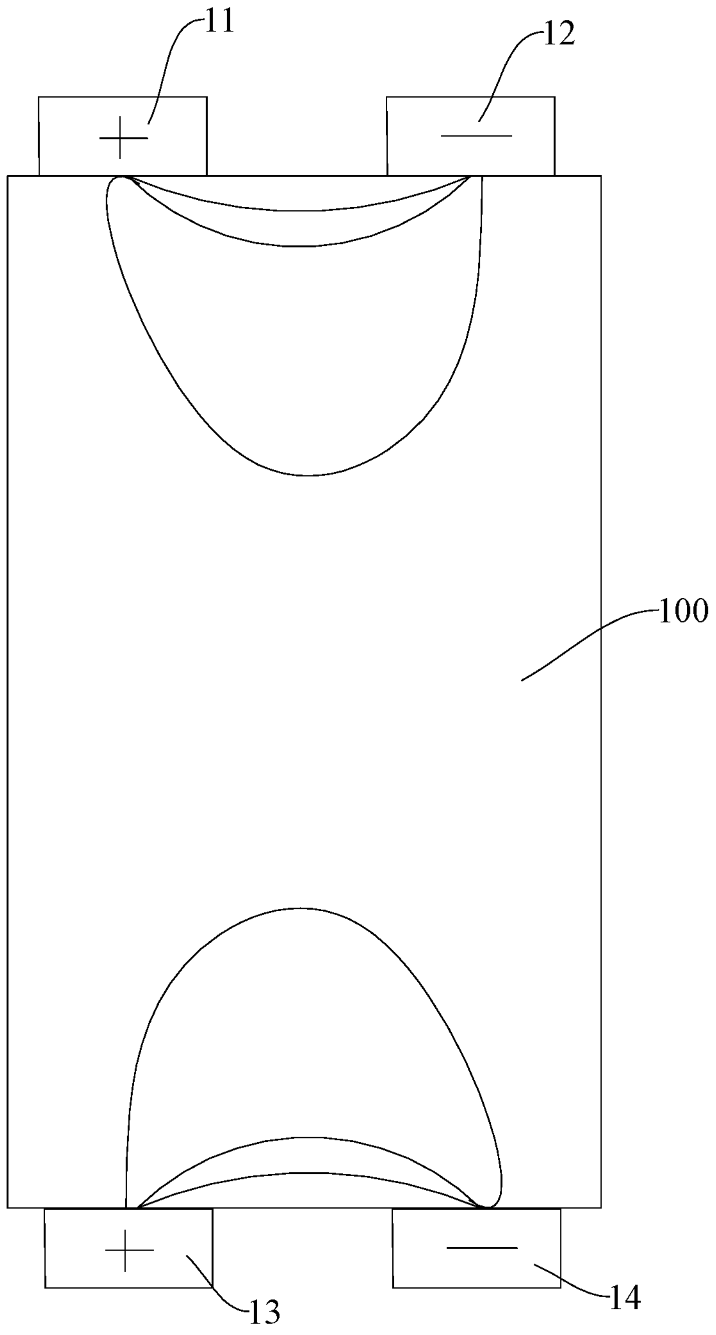
FIG. 1 is a schematic structural view of a cell in a battery module according to an embodiment of this application.
Figure 2:
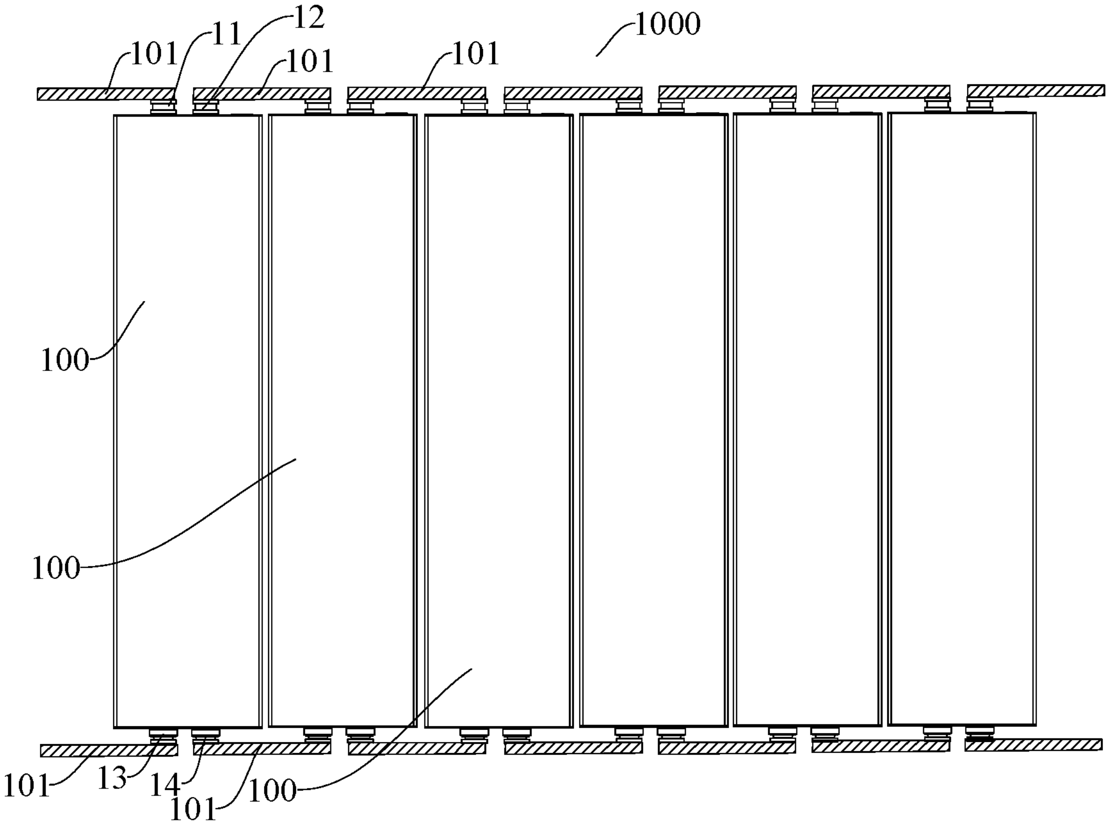
FIG. 2 is a schematic structural view of a battery module according to an embodiment of this application.

As shown in FIGS. 1 and 2, the battery module 1000 according to an embodiment of this application includes n cells 100.

The cell 100 has a plurality of surfaces. One of at least two of the surfaces is provided with a first positive terminal 11 and a first negative terminal 12. Another one of the at least two of the surfaces is provided with a second positive terminal 13 and a second negative terminal 14.

The cell 100 can be electrically connected to the outside (other cells 100) through the first positive terminal 11, the first negative terminal 12, the second positive terminal 13 and the second negative terminal 14.

The cell has a first end surface and a second end surface, and the first end surface and the second end surface are opposite to each other. The first positive terminal and the first negative terminal are provided on the first end surface, and the second positive terminal and the second negative terminal are provided on the second end surface. In this way, the first positive terminal 11 and the second positive terminal 13 of the cell 100 are spaced apart, and the first negative terminal 12 and the second negative terminal 14 are spaced apart. Therefore, the first positive terminal 11 is prevented from contacting the second positive terminal 13, and the first negative terminal 12 is prevented from contacting the second negative terminal 14. This avoids the short circuit of the cell 100, improves the safety of the cell 100 during use, and facilitates the connection of two adjacent cells 100 by a connecting piece 101.

As shown in FIG. 2, the first positive terminal 11 of a first one of two adjacent cells 100 is connected to the first negative terminal 12 of a second one. The second positive terminal 13 of the first one of the two adjacent cells 100 is connected to the second negative terminal 14 of the second one. The inside of the cells 100 is brought into electric conduction by the first positive terminals 11 and the first negative terminals 12, and also by the second positive terminal 13 and the second negative terminal 14.

In this way, two adjacent cells 100 are connected by two electrode terminal pairs to improve the current flowing-through capacity, and thus improve the safety and stability of the cell 100 during use. Moreover, bidirectional output of the cell 100 is realized, which shortens the transmit path of current, greatly reduces the internal resistance of the cell, and enhances the current flowing-through efficiency.

The cell 100 is designed to have four terminals, which reduces the size of a single terminal, reduces the difficulty of sealing and manufacturing a single terminal, is beneficial to the production, and reduces the manufacturing cost.

As shown in FIG. 2, n cells 100 are arranged side by side and are connected in series. The first negative terminal 12 of a (k−1)th cell 100 is connected to the first positive terminal 11 of a kth cell 100. The first negative terminal 12 of the kth cell 100 is connected to the first positive terminal 11 of a (k+1)th cell 100. The second negative terminal 14 of the (k−1)th cell 100 is connected to the second positive terminal 13 of the kth cell 100. The second negative terminal 14 of the kth cell 100 is connected to the second positive terminal 13 of the (k+1)th cell 100, where $2 \le k \le n-1$ and $n \ge 3$. That is, at least 3 cells 100 are provided. In this way, the n cells 100 are sequentially connected as a whole through the negative terminals and the positive terminals. The positive terminals and negative terminals of two adjacent cells 100 are electrically connected by the connecting pieces 101, such that the battery module 1000 has a higher current flowing-through capacity. In some embodiments, as shown in FIG. 2, 6 cells 100 are provided, and the 6 cells 100 are arranged side by side in series. The first negative terminal 12 of a 1st cell 100 is connected to the first positive terminal 11 of a 2nd cell 100. The first negative terminal 12 of the 2nd cell 100 is connected to the first positive terminal 11 of a 3rd cell 100. The second negative terminal 14 of the 1st cell 100 is connected to the second positive terminal 13 of the 2nd cell 100. The second negative terminal 14 of the 2nd cell 100 is connected to the second positive terminal 13 of the 3rd cell 100.

In this way, the 6 cells 100 are sequentially connected as a whole by the first negative terminals 12 and the first positive terminals 11, so that the current is allowed to flow through the first negative terminal 12 and the first positive terminal 11; and also sequentially connected as a whole by the second negative terminals 14 and the second positive terminals 13, so that the current is allowed to flow through the second negative terminal 14 and the second positive terminal 13. Therefore, the cell 100 is designed to have four terminals, which reduces the size of a single terminal, reduces the difficulty of sealing and manufacturing a single terminal, improves the current flowing-through capacity, and thus improve the safety and stability of the cell 100 during use. Moreover, bidirectional output of the cell 100 is realized, which shortens the transmit path of current, greatly reduces the internal resistance of the cell, and enhances the current flowing-through efficiency.

The cell 100 includes a core, and the cell 100 has a length direction and a width direction perpendicular to the length direction. The core includes a positive electrode plate, an insulating separator, and a negative electrode plate stacked in sequence. Two ends of the positive electrode plate along the length direction are respectively electrically connected with a positive tab. Two ends of the negative electrode plate along the length direction are respectively electrically connected with a negative tab. At either end along the length direction, the positive tab and the negative tab are arranged to be staggered along the width direction.

The cell 100 according to an embodiment of this application includes at least two electrode terminal pairs each including a positive electrode terminal and a negative electrode terminal, and the at least two pairs of positive and negative electrode terminals can be both connected to the outside (other cells 100). Therefore, the current flowing-through capacity of the cell 100 is increased, bi-directional output is realized, the internal resistance of the cell 100 is reduced, and the side-by-side serial connection is achieved, to reduce the number of cells.

In some embodiments, the battery module 1000 includes n cells 100.

The cell 100 includes a housing and a core.

The core is located inside the casing. The housing has a first end surface and a second end surface. The first positive terminal 11 and the first negative terminal 12 are provided on the first end surface. The second positive terminal 13 and the second negative terminal 14 are provided on the second end surface. The core has a first end and a second end. A plurality of first positive tabs and first negative tabs extend from the first end. The plurality of first positive tabs are respectively connected to the first positive terminals 11. The plurality of first negative tabs are respectively connected to the first negative terminals 12. A plurality of second positive tabs and second negative tabs extend from the second end. The plurality of second positive tab are respectively connected to the second positive terminal 13. The plurality of second negative tab are respectively connected to the second negative terminal 14.

In some embodiments, a first end plate and a second end plate are respectively provided at two ends of the housing. The first end plate and the second end plate are opposite to each other. The first positive terminal 11 and the first negative terminal 12 are provided on the first end plate. The second positive terminal 13 and the second negative terminal 14 are provided on the second end plate. That is, the first end plate of each cell 100 is provided with the first positive terminal 11 and the first negative terminal 12, and the second end plate of each cell 100 is provided with the second positive terminal 13 and the second negative terminal 14. The cell 100 can be electrically connected to the outside (other cells 100) through the first positive terminal 11, the first negative terminal 12, the second positive terminal 13 and the second negative terminal 14.

As shown in FIG. 2, the terminal extends through the corresponding end plate. The first positive terminal 11 and the first negative terminal 12 extend through the first end plate. The second positive terminal 13 and the second negative terminal 14 extend through the second end plate. That is, two ends of the terminal are respectively located at two sides of the end plate. A first end of the terminal is located inside the housing, to allow the first end of the terminal to be electrically connected to an electricity-storage element in a mounting cavity. A second end of the terminal is located outside the housing, to allow the second end of the terminal to be electrically connected to an external electric device. As such, the electric energy in the cell 100 can be output to the external electric device. Alternatively, the second end of the terminal is connected to an adjacent cell 100, so that a plurality of cells 100 are connected in series, to achieve the simultaneous charge and discharge of the plurality of cells 100, and improve the efficiency of using the battery pack.

In this way, two adjacent cells 100 are connected by two electrode terminal pairs to improve the current flowing-through capacity, and thus improve the safety and stability of the cell 100 during use. Moreover, bidirectional output of the cell 100 is realized, which shortens the transmit path of current, greatly reduces the internal resistance of the cell, and enhances the current flowing-through efficiency.

As shown in FIG. 2, n cells 100 are arranged side by side in series. The first positive terminal 11 and the first negative terminal 12 run through the first end plate. The second positive terminal 13 and the second negative terminal 14 extend through the second end plate. The first negative terminal 12 of a (k−1)th cell 100 is connected to the first positive terminal 11 of a kth cell 100. The first negative terminal 12 of the kth cell 100 is connected to the first positive terminal 11 of a (k+1)th cell 100. The second negative terminal 14 of the (k−1)th cell 100 is connected to the second positive terminal 13 of the kth cell 100. The second negative terminal 14 of the kth cell 100 is connected to the second positive terminal 13 of the (k+1)th cell 100, where $2 \le k \le n-1$ and $n \ge 3$. That is, at least 3 cells 100 are provided. In this way, the n cells 100 are sequentially connected as a whole through the negative terminals and the positive terminals. The positive terminals and negative terminals of two adjacent cells 100 are electrically connected by the connecting pieces 101.

In some embodiments, the cell 100 has a length L, a width H, and a thickness T, where $10 < L/H$, and in some specific implementations, $10 < L/H \le 20$, and $23 \le L/T \le 200$, for example, $L/H=12$, and $L/T=60$; or $L/H=14$, and $L/T=120$; or $L/H=18$, and $L/T=180$. Therefore, when the designed dimensions of the cell 100 are within this range, the overall structure of the cell 100 more conforms to a standardized design, and can be widely used in various power battery modules 1000, to expand the scope of application.

The designed ratio of the length, width, and thickness of the cell 100 is beneficial to increasing the energy density of the entire power battery pack, to give a higher volumetric specific energy.

The length of the cell 100 meets 600 mm≤L≤1300 mm. In a specific implementation, the length of the cell 100 meets 701 mm≤L≤1300 mm, for example, L=800 mm, L=900 mm, or L=1200 mm. It should be noted that a too large size of the cell 100 can easily lead to a decrease in the current flowing-through capacity and even an increase in the impedance of the current collector. The size of the cell 100 in this application is designed within a reasonable range, to ensure that the cell 100 has a large output current, a high current flowing-through capacity, and a reduced difficulty in design and sealing of the cell 100.

In some embodiments, the cell 100 includes a housing and a core.

An end plate of the shell is provided with a terminal for electrical connection with the outside. The end plate includes a first end plate and a second end plate respectively provided at two ends of the housing. The first end plate and the second end plate are opposite to each other. Each of the first end plate and the second end plate is provided with a positive terminal and a negative terminal. For example, the first end plate of each cell 100 is provided with the first positive terminal 11 and the first negative terminal 12, and the second end plate of each cell 100 is provided with the second positive terminal 13 and the second negative terminal 14. The cell 100 can be electrically connected to the outside (other cells 100) through the first positive terminal 11, the first negative terminal 12, the second positive terminal 13 and the second negative terminal 14.

The positive terminals and the negative terminals extend through the first end plate and the second end plate. The first positive terminal 11 and the first negative terminal 12 extend through the first end plate. The second positive terminal 13 and the second negative terminal 14 extend through the second end plate. That is, two ends of the terminal are respectively located at two sides of the end plate. A first end of the terminal is located inside the housing, to allow the first end of the terminal to be electrically connected to an electricity-storage element in a mounting cavity. A second end of the terminal is located outside the housing, to allow the second end of the terminal to be electrically connected to an external electric device. In this way, the electric energy in the cell 100 can be output to the external electric device.

The core is accommodated in the housing, and acts as an electricity-storage element in the shell, for charge and discharge to the outside. It should be noted that both ends of the core are provided with a positive tab and a negative tab. That is, the tabs include positive tabs and negative tabs, where the positive tab is connected to the corresponding positive terminal and the negative tab is connected to the corresponding negative terminal. The terminal extends into one end of the end plate to electrically connect to a corresponding tab. In this way, one end of the core is electrically connected to the positive terminal by the positive tab, and the other end of the core is electrically connected to the negative terminal by the negative tab. Therefore, the core is conducted to an external circuit by means of a current.

In some embodiments, the core includes a plurality of sub-cores.

The sub-core includes a positive electrode plate and a negative electrode plate. An insulating separator is provided between the positive electrode plate and the negative electrode plate. The insulating separator can effectively separate the positive electrode plate from the negative electrode plate, so that the positive electrode plate and the negative electrode plate are maintained to have a normal current flow state. This prevents the positive electrode plate and the negative electrode plate from interfering with each other, and avoids the contact and short circuit between the positive electrode plate and the negative electrode plate, thereby improving the safety of the cell 100. The area of the insulating separator is larger than that of the positive electrode plate and the negative electrode plate. In this way, the insulating separator can effectively isolate the positive electrode plate from the negative electrode plate.

The positive electrode plate is electrically connected with a positive tab, and the negative electrode plate is electrically connected with a negative tab. In some embodiments, the core includes at least 2 sub-cores. The positive electrode plate of one of the 2 sub-cores is arranged adjacent to the negative electrode plate of the other sub-core. As a result, the core consists of multiple positive electrode plates and multiple negative electrode plates stacked alternately. This effectively increases the battery capacity of the cell 100, and facilitates the current output from the core.

The adjacent tabs in two sub-cores where the positive tab and the negative tab are adjacent are led out in reverse directions. Therefore, multiple tabs of the cell 100 are led out from different sides, to form a decentralized arrangement of the overall structure of the cell 100. This makes the overall structure distribution of the cell 100 more even.

The plurality of sub-cores are stacked along a thickness direction of the cell 100.

Figure 3:
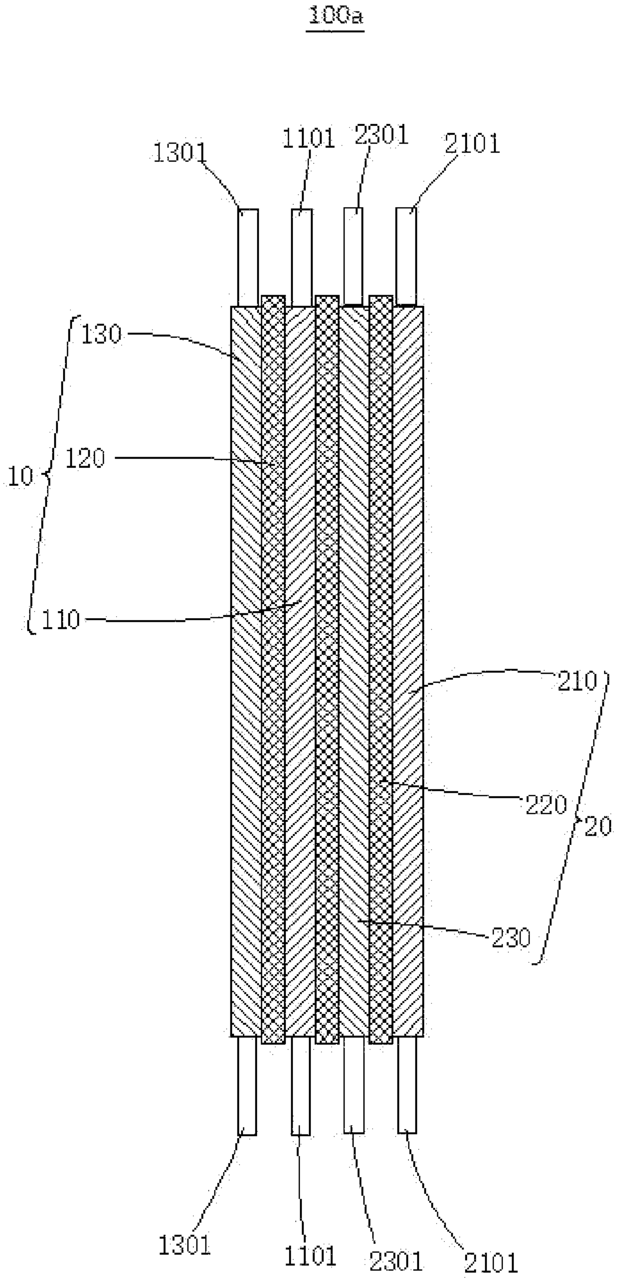
FIG. 3 is a schematic structural view of a core according to a preferred embodiment of this application.
Figure 4:
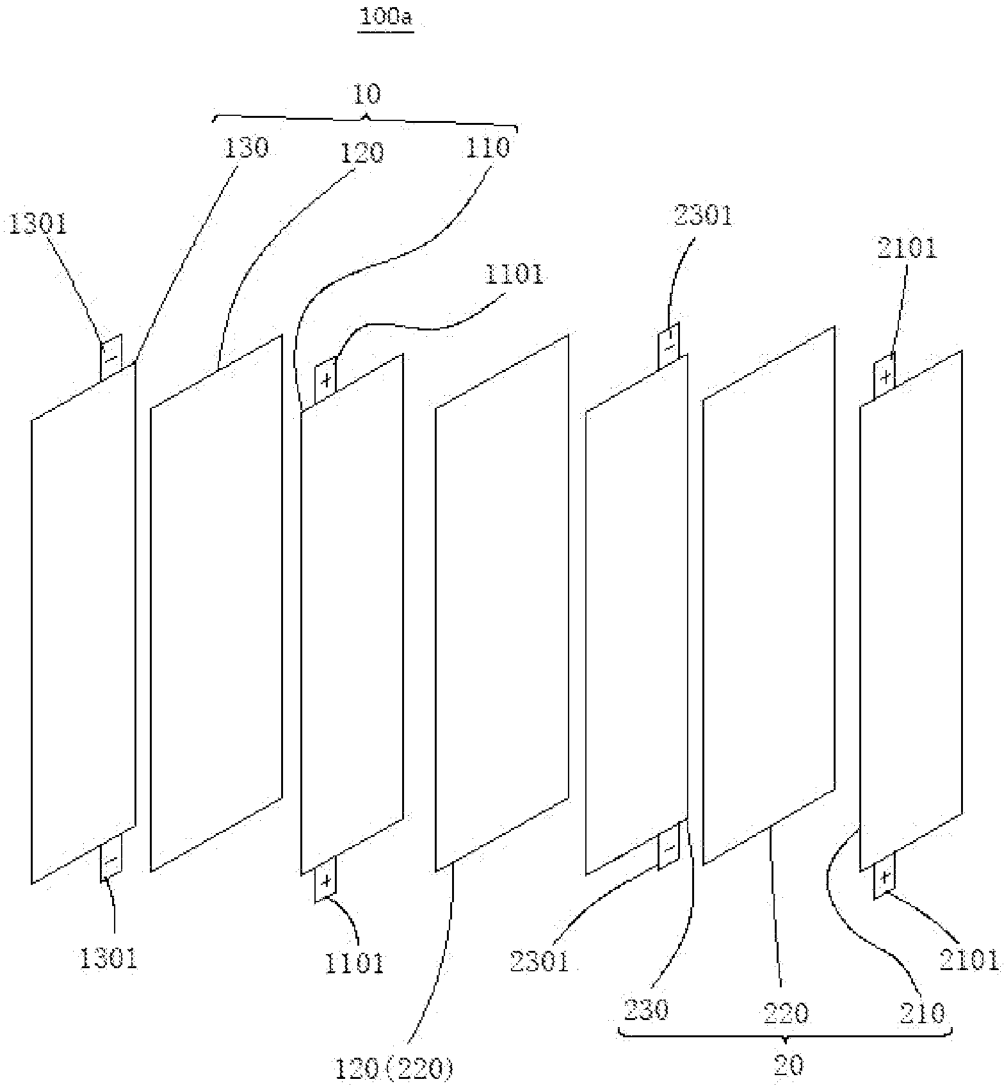
FIG. 4 is a schematic structural exploded view of the core in FIG. 3.

Referring to FIGS. 3 and 4, in some embodiments, the cell 100 includes 2 sub-cores. The 2 sub-cores are stacked along the thickness direction of the cell 100. That is, the arrangement direction of the sub-cores is the same as the stacking direction of the corresponding positive electrode plate and negative electrode plate, so that the sub-cores are in stable contact with each other, and kept stably in the housing, to realize relative fixation. Moreover, the positive tab and negative tab in each sub-core are staggered along the width direction of the cell 100, to avoid a too much concentrated arrangement of the positive tab and the negative tab, and prevent the contact and short circuit between the positive tab and the negative tab, thereby improving the safety of the cell 100.

For example, in a specific implementation, a core **100*a* of the cell 100 includes a first sub-core 10 and a second sub-core 20**.

The first sub-core 10 includes a first negative electrode plate 130, an insulating separator 120, and a first positive electrode plate 110 stacked in sequence.

The second sub-core 20 includes a second negative electrode plate 230, an insulating separator 220, and a second positive electrode plate 210 stacked in sequence. In addition, in the core **100*a*, the second negative electrode plate 230 is arranged adjacent to the first positive electrode plate 110 and is isolated therefrom by an insulating separator 120 (or 220**).

The first positive electrode plate 110 is provided with a first positive tab 1101 at either end along its length direction. The two first positive tabs 1101 are close to the edge of one side in the width direction of the first positive electrode plate 110. In other words, the two first positive tabs 1101 deviate from the center of the first positive electrode plate 110 in the width direction. This facilitates the staggered arrangement of the tabs along the width direction.

The first negative electrode plate 130 is provided with a first negative tab 1301 at either end along its length direction. The two first negative tabs 1301 are close to the edge of one side in the width direction of the first negative electrode plate 120. In other words, the two first negative tabs 1301 deviate from the center of the first negative electrode plate 130 in the width direction. In addition, in the first sub-core 10, after the first negative electrode plate 130, the insulating separator 120, and the first positive electrode plate 110 are stacked in sequence, the first positive tab 1101 and the first negative tab 1301 are respectively located on two sides in the width direction. That is, they are arranged in a staggered pattern.

Similarly, the second positive electrode plate 210 is provided with a second positive tab 2101 at either end along its length direction. The two second positive tabs 2101 are close to the edge of one side in the width direction of the second positive electrode plate 210. In other words, the two second positive tabs 2101 deviate from the center of the second positive electrode plate 210 in the width direction. This facilitates the staggered arrangement of the tabs along the width direction.

The second negative electrode plate 230 is provided with a second negative tab 2301 at either end along its length direction. The two second negative tabs 2301 are close to the edge of one side in the width direction of the second negative electrode plate 220. In other words, the two second negative tabs 2301 deviate from the center of the second negative electrode plate 230 in the width direction. In addition, in the second sub-core 20, after the second negative electrode plate 230, the insulating separator 220, and the second positive electrode plate 210 are stacked in sequence, the second positive tab 2101 and the second negative tab 2301 are respectively located on two sides in the width direction. That is, they are arranged in a staggered pattern.

Adjacent tabs in the first sub-core 10 and the second sub-core 20 are the first positive tab 1101 and the second negative tab 2301. The first positive tab 1101 and the second negative tab 2301 are led out from the two sides in the width direction, respectively. That is, the lead-out directions are opposite, to achieve the staggered arrangement.

The positive tab or the negative tab has a width H1, and the positive electrode plate or the negative electrode plate in the core has a width H2, where H1 and H2 meet $35\% \leq H1/H2 \leq 45\%$, for example, $H1/H2=37\%$, $H1/H2=40\%$, or $H1/H2=42\%$. That is, the width of the tab is smaller than that of the positive electrode plate or the negative electrode plate, and the width of the tab is less than half of the width of the positive electrode plate or the negative electrode plate. As a result, the contact width when the tab is connected to the positive electrode plate or the negative electrode plate is the width of the tab. It enables the tab to be in stable current conduction with the positive electrode plate or the negative electrode plate.

The current flowing-through width of the positive electrode plate or the negative electrode plate is greater than the current flowing-through width of the tab. The current flowing-through width of the tab is greater than the current flowing-through width of the terminal. Moreover, the thickness of the terminal is larger. Therefore, the core, the tab and the terminal all have excellent current flowing-through capacity. As such, the cell 100 has excellent charge and discharge performance, to improve the efficiency of electrical energy output to an external electrical device, enhance the charge efficiency of the cell 100, and save the charge and discharge time required by a user to reduce the time cost, thus bringing convenience during use by a user.

In addition, the tab and core both have larger contact surfaces. When the terminal, tab and core are mounted and fitted to one another, the tab and terminal have a larger contact area. and the tab and the core have a larger contact area. Accordingly, the current flowing-through efficiency between the terminal, the tab and the core is improved. Moreover, the tab, core and terminal are easy to be mounted and fixed, and a stable contact state can be maintained for a long time, thereby improving the assembly efficiency while extending the service life, reducing the design accuracy and process difficulty of the cell 100 and increasing the current flowing-through capacity.

In some embodiments, the cell 100 also includes: an insulating spacer.

The insulating spacer is arranged between the end plate and the core, that is, the insulating spacer is located at an end portion of the core. The insulating spacer has good insulating properties, and used to space the positive tab and the negative tab apart. In this way, the positive tab is prevented from direct contact with the negative tab, so that the positive tab and the negative tab are maintained to have a normal current flow state. This prevents the positive tab and the negative tab from interfering with each other, and avoids the contact and short circuit between the positive tab and the negative tab, thereby improving the safety of the cell 100.

The insulating spacer has an isolating plate extending toward the core. The isolating plate gradually extends from a side surface of the insulating spacer facing the core toward the core, and the isolating plate is located between the positive tab and the negative tab. The positive tab and the negative tab are respectively located at two sides of the isolating plate. The area of the isolating plate is larger than the area of the positive tab and the negative tab, to effectively isolate the positive tab and the negative tab. This prevents the positive tab and the negative tab from interfering with each other, and avoids the contact and short circuit between the positive tab and the negative tab, thereby improving the safety of the cell 100.

The isolating plate having a free end adapted to abut against the core, to extend between the positive tab and the negative tab without a gap, thereby ensuring that no current conduction exists between the positive tab and the negative tab, and improving the safety of the cell 100.

In some embodiments, a plurality of isolating plates are provided, where the plurality of isolating plates are arranged at intervals along a direction from the positive tab to the negative tab, and the distance between two adjacent isolating plates is greater than the thickness of the isolating plate itself. Therefore, when the cell 100 vibrates under a force to cause the isolating plate to deform, the distance between two isolating plates can accommodate partial deformation of the isolating plate, and the positive tab and the negative tab will not cross the gap. thereby more effectively preventing the positive tab from contact with the negative tab, and improving the safety of the cell 100.

The insulating spacer defines multiple avoidance holes. The positive tab or negative tab is adapted to extend through an avoidance hole to connect to the corresponding positive terminal or negative terminal. As such, the insulating spacer isolates the positive tab and the negative tab, without affecting the normal conduction between the tab and the terminal, this ensures that the core can be connected to the terminal through the tab to realize the charge and discharge of the cell 100.

In some embodiments, at least one of the two end plates is provided with a lead-out piece. The lead-out piece is arranged on the side facing the core, and directly electrically connected to the tab and terminal. That is, an inner end of the lead-out piece is electrically connected to the tab, and an external end of the lead-out piece is electrically connected to the terminal. In this way, the core can be electrically connected to the terminal by the tab and the lead-out piece. Therefore, by providing the lead-out piece, the poor contact caused by a too short length of the terminal or the tab can be reduced, to ensure that the tab and the terminal are in effective contact with the lead-out piece, and improve the stability in current conduction of the cell 100. It is convenient for long-term use.

The width of the tab is the contact width between the lead-out piece and the tab, and the width of the lead-out piece is not less than the contact width with the tab. As such, the current flowing-through width between the lead-out piece and the tab is the width of the tab itself, and the width of the tab is larger. As a result, an excellent current flowing-through efficiency is ensured to exist between the lead-out piece and the tab, to improve the current flowing-through capacity of the cell 100.

The tab 12 is integrated with the current collector. The tab 12 and the current collector are formed by die-cutting of a copper foil or an aluminum foil. In this way, on the one hand, the tab 12 is rapidly formed and the process cost is reduced. On the other hand, the current transmission performance is much better after the tab and the current collector are integrated. The tab 12 can be die-cut into a shape as desired, and easily structured, to bring flexibility in use.

In some embodiments, the electrode plate in the core 15 further includes a current collector.

The current collector includes: a coverage area and an insulating area. The insulating area is provided between the tab and the coverage area, and covered with an insulating layer. The insulating layer is made of insulating rubber or inorganic ceramic particles, and can insulate and protect the tab, to prevent the structure of the tab from being destroyed and improve the safety during the use of the tab.

In some embodiments, the cell 100 also includes an anti-explosion valve.

The anti-explosion valve is provided on the end plate, and located lateral to the two terminals. The anti-explosion valve can be used as a pressure relieving means for the cell 100, and relieves the pressure when the pressure in the cell 100 is abnormal or too high, to keep the pressure in the mounting cavity within a safe range. In this manner, the cell 100 as a whole can be prevented from expansion and deformation caused by a too high internal pressure, to improve the safety and stability of the cell 100 in use.

In some embodiments, a single core is accommodated in the housing, in which one end of the core is electrically connected to the positive terminal, and the other end is electrically connected to the negative terminal. The core may be a stacked core, that is, the core is formed by stacking a plurality of electrode plates. Two ends of each electrode plate are respectively electrically connected to a terminal located at the two ends, to ensure that the core and the terminal have good conductivity. Certainly, the core may also be a wound core, with which the effect of current conduction can also be realized.

This application also proposes another battery module 1000.

The battery module 1000 according to an embodiment of this application includes two cells 100.

A first end plate of each cell 100 is provided with a first positive terminal 11 and a first negative terminal 12, and a second end plate of each cell 100 is provided with a second positive terminal 13 and a second negative terminal 14. The two cells 100 are arranged side by side in series. The first negative terminal 12 of the first cell 100 is connected to the first positive terminal 11 of the second cell 100. The second negative terminal 14 of the first cell 100 is connected to the second positive terminal 13 of the second cell 100. In this manner, bidirectional output of the cell 100 is realized, which shortens the transmit path of current, greatly reduces the internal resistance of the cell, and enhances the current flowing-through efficiency. Each of the cells 100 is designed to have four terminals, which reduces the size of a single terminal, and reduces the difficulty of sealing and manufacturing a single terminal.

This application also proposes a power battery pack.

The power battery pack according to an embodiment of this application includes a battery pack casing and a plurality of cells according to the foregoing embodiments.

The cells 100 are mounted in the battery pack casing, and the plurality of cells 100 are arranged in sequence, with the upper and lower ends of the plurality of cells 100 being kept flushed. In this way, the terminals of the plurality of cells 100 can be connected in series by connecting pieces 101, and the plurality of cells 100 can be charged and discharged at the same time. to improve the charge and discharge efficiency of the power battery pack, and increase the battery capacity of the power battery pack.

The battery pack casing is filled with a thermally conductive insulating layer encasing the battery module 1000. The thermally conductive insulating layer can effectively isolate the battery module 1000 from the battery pack casing, to prevent the short circuit of the cell 100 in the battery module 1000; and protect the battery module 1000, to protect the battery module 1000 against deformation caused by a too large force, thereby increasing the safety of the power battery pack. The thermally conductive insulating layer can be made of a rubber material.

This application further proposes a vehicle.

The vehicle according to an embodiment of this application has a power battery pack according to the foregoing embodiments. When the cell 100 in the power battery pack fails, other cells 100 can still work normally, to ensure that the vehicle persistently has a stable power output, improve the practicability and safety of the whole vehicle, and bringing convenience to the maintenance of the power battery pack.

Specific Embodiments

Embodiment 1

The cell includes a housing and a core located in the housing. Two surfaces of the housing are respectively provided with terminals which are electrically connected to the core and extend out of the housing for outputting current. 2 terminals are provided on each surface, and tabs are arranged on the core. The terminal is electrically connected to the core by the tab. Lis the length of the cell, and H is the width of the cell, where L/H=11, and L=400 mm. The cell is designated as S1.

Embodiment 2

The difference from Embodiment 1 is that L/H=13, and L=600 mm. The cell is designated as S2.

Embodiment 3

The difference from Embodiment 1 is that L/H=15, and L=800 mm. The cell is designated as S3.

Embodiment 4

The difference from Embodiment 1 is that L/H=17, and L=1000 mm. The cell is designated as S4.

Embodiment 5

The difference from Embodiment 1 is that L/H=23, L=1300 mm, and L/T=50. The cell is designated as S5.

Embodiment 6

The difference from Embodiment 1 is that L/H=11, L=1300 mm, and L/T=100. The cell is designated as S6.

Embodiment 7-Embodiment 12

The battery module includes n cells (the cell is one of S1-S6). The cell has a plurality of surfaces. One of at least two of the surfaces is provided with a first positive terminal and a first negative terminal. Another one of the at least two of the surfaces is provided with a second positive terminal and a second negative terminal.

The n cells are arranged side by side in series. The first negative terminal of a (k−1)th cell is connected to the first positive terminal of a kth cell. The first negative terminal of the kth cell is connected to the first positive terminal of the (k+1)th cell.

The second negative terminal of the (k−1)th cell is connected to the second positive terminal of the kth cell. The second negative terminal of the kth cell is connected to the second positive terminal of the (k+1)th cell, where 2≤k≤n−1 and n=6. The battery modules are respectively designated as Z6-Z12.

Comparative Embodiment 1

The difference from Embodiment 2 is that two ends of the core are respectively provided with a group of tabs, and a terminal is provided on each of the two opposite sides of the housing. The cell is designated as D1.

Comparative Embodiment 2

The difference from Embodiment 3 is that two ends of the core are respectively provided with a group of tabs, and a terminal is provided on each of the two opposite sides of the housing. The cell is designated as D2.

Comparative Embodiment 3

The difference from Embodiment 1 is that L/H=2.5, and L=400 mm. The cell is designated as D3.

Comparative Embodiment 4-Comparative Embodiment 6 n cells (the cell is one of D1, D2, and D3) are connected in series to obtain a battery module. The battery modules are respectively designated as D4-D6.

Test Methods

1) Direct Current Internal Resistance (DCIR) of Cell

Test Equipment: Charge and Discharge Test Cabinet

Test method: The equipment is adjusted to measure the discharge parameter DCIR at normal temperature, 50% SOC, and 1.5 C for 30 s. The test results for Embodiment 1-Embodiment 7 and Comparative Embodiment 1-Comparative Embodiment 3 are shown in Table 1. (The test method is a common method in the art).

2) Temperature Rise Over Current Flowing-Through

Test Equipment: Charge and Discharge Test Cabinet, Thermocouple, and Agilent Data Collector Test method: The equipment was adjusted to measure the temperature rise parameters of the positive terminal and the lead-out piece under a continuous charge and discharge test condition at 2 C in an adiabatic environment. The test results for Embodiment 1-Embodiment 6 and Comparative Embodiment 1-Comparative Embodiment 3 are shown in Table 1. (The test method is a common method in the art).

3) Energy Efficiency Test

Test Equipment: Charge and Discharge Test Cabinet

Test method: The charge and discharge test cabinet is electrically connected, and the energy efficiency parameter of the last charge and discharge cycle is measured after 3 continuous charge and discharge cycles at 1 C. The test results for Embodiment 1-Embodiment 6 and Comparative Embodiment 1-Comparative Embodiment 3 are shown in Table 1. (The test method is a common method in the art).

4) DCIR of Battery Module

Test Equipment: Charge and Discharge Test Cabinet

Test method The equipment is adjusted to measure the discharge parameter DCIR at normal temperature, 50% SOC, and 1.5 C for 30 s. The battery modules in Embodiment 7-Embodiment 12 and Comparative Embodiment 4-Comparative Embodiment 6 are tested, and the test results are shown in Table 1. (The test method is a common method in the art).

TABLE 1

| No. | DCIR of cell | Temperature rise | Energy efficiency | No. | DCIR of battery module |
|---|---|---|---|---|---|
| Embodiment 1 | 0.65-0.8 | 10-15° C. | 92%-94% | Embodiment 7 | >N*DCIR of cell |
| Embodiment 2 | 0.7-0.85 | 12-18° C. | 91-93% | Embodiment 8 | >N*DCIR of cell |
| Embodiment 3 | 0.8-1.0 | 15-20° C. | 90%-92% | Embodiment 9 | >N*DCIR of cell |
| Embodiment 4 | 0.9-1.1 | 18-22° C. | 89%-91% | Embodiment 10 | >N*DCIR of cell |
| Embodiment 5 | 1.5-2.0 | 20-24° C. | 89%-91% | Embodiment 11 | >N*DCIR of cell |
| Embodiment 6 | 2.5-3.0 | 22-26° C. | 89%-91% | Embodiment 12 | >N*DCIR of cell |
| Comparative Embodiment 1 | 1.2-1.6 | 20-25° C. | 83%-87% | Comparative Embodiment 4 | >N*DCIR of cell |
| Comparative Embodiment 2 | 1.4-1.8 | 22-27° C. | 86%-88% | Comparative Embodiment 5 | >N*DCIR of cell |
| Comparative Embodiment 3 | 1.6-2.0 | 25-30° C. | 87%-89% | Comparative Embodiment 6 | >N*DCIR of cell |

The battery module (1000) according to an embodiment of this application includes n cells (100). The cell (100) has a plurality of surfaces. One of at least two of the surfaces is provided with a first positive terminal (11) and a first negative terminal (12); and another one of the at least two of the surfaces is provided with a second positive terminal (13) and a second negative terminal (14). The n cells (100) are arranged side by side in series. The first negative terminal (12) of a (k−1)th cell (100) is connected to the first positive terminal (11) of a kth cell (100). The first negative terminal (12) of the kth cell (100) is connected to the first positive terminal (11) of a (k+1)th cell (100). The second negative terminal (14) of the (k−1)th cell (100) is connected to the second positive terminal (13) of the kth cell (100). The second negative terminal (14) of the kth cell (100) is connected to the second positive terminal (13) of the (k+1)th cell (100), where 2≤k≤n−1 and n≥3. The cell (100) has a length L and a width H, where L meets 600 mm<L≤1300 mm, and L and H meet 10<L/H≤20.

In the battery module (1000) according to an embodiment of this application, the cell has a first end surface and a second end surface, and the first end surface and the second end surface are opposite to each other. The first positive terminal (11) and the first negative terminal (12) are provided on the first end surface, and the second positive terminal (13) and the second negative terminal (14) are provided on the second end surface.

In the battery module (1000) according to an embodiment of this application, the cell (100) includes a housing and a core located inside the housing, and the housing has a first end surface and a second end surface. The first positive terminal (11) and the first negative terminal (12) are provided on the first end surface, and the second positive terminal (13) and the second negative terminal (14) are provided on the second end surface. The core has a first end and a second end. A plurality of first positive tabs and first negative tabs extend from the first end. The first positive tab is connected to the first positive terminal (11). The first negative tab is connected to the first negative terminal (12). A plurality of second positive tabs and second negative tabs extend from the second end. The second positive tab is connected to the second positive terminal (13). The second negative tab is connected to the second negative terminal (14).

In the battery module (1000) according to an embodiment of this application, a first end plate and a second end plate opposite to each other are respectively provided at two ends of the housing. The first positive terminal (11) and the first negative terminal (12) are provided on the first end plate, and extend through the first end plate. The second positive terminal (13) and the second negative terminal (14) are provided on the second end plate.

In the battery module (1000) according to an embodiment of this application, the core includes a plurality of sub-cores. Each of the sub-cores includes a positive electrode plate, an insulating separator, and a negative electrode plate. The positive electrode plate is electrically connected with a positive tab, and the negative electrode plate is electrically connected to a negative tab. Adjacent tabs in two adjacent sub-cores are located on two opposite sides in the width direction.

In the battery module (1000) according to an embodiment of this application, the plurality of sub-cores are stacked along a thickness direction of the cell (100). The positive tab and the negative tab of each of the sub-cores are staggered along the width direction of the cell (100).

The battery module (1000) according to an embodiment of this application also includes: an insulating spacer. The insulating spacer is arranged between the end plate and the core, and used to space the positive tab and the negative tab apart.

In the battery module (1000) according to an embodiment of this application, the insulating spacer has an isolating plate extending toward the core, and the isolating plate is located between the positive tab and the negative tab.

In the battery module (1000) according to an embodiment of this application, a plurality of isolating plates are provided, where the plurality of isolating plates are arranged at intervals along a direction from the positive tab to the negative tab.

In the battery module (1000) according to an embodiment of this application, the insulating spacer defines multiple avoidance holes. The positive tab or negative tab is adapted to extend through an avoidance hole to connect to the corresponding positive terminal or negative terminal.

In the battery module (1000) according to an embodiment of this application, $35\% \leq H1/H2 \leq 45\%$, where H1 is the width of the positive tab or the negative tab, and H2 is the width of the positive electrode plate or the negative electrode plate.

In the battery module (1000) according to an embodiment of this application, the electrode plate in the core further includes a current collector, and the positive tab or negative tab is integrated with the corresponding current collector.

This application also proposes a battery module (1000), which includes two cells (100). A first end plate of each cell (100) is provided with a first positive terminal (11) and a first negative terminal (12), and a second end plate of each cell (100) is provided with a second positive terminal (13) and a second negative terminal 14). The two cells (100) are arranged side by side in series. The first negative terminal (12) of a first cell (100) is connected to the first positive terminal (11) of a second cell (100). The second negative terminal (14) of the first cell (100) is connected to the second positive terminal (13) of the second cell (100). The cell (100) has a length L and a width H, where L meets 600 mm<L≤1300 mm, and L and H meet 10<L/H≤20.

This application also proposes a power battery pack, which includes a battery pack casing; and a battery module (1000) as described above. The battery module (1000) is mounted in the battery pack casing.

In the power battery pack according to an embodiment of this application, the battery pack casing is filled with a thermally conductive insulating layer encasing the battery module (1000).

This application further proposes a vehicle, having a power battery pack according to the foregoing embodiments.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of this application. In this specification, exemplary descriptions of the foregoing terms do not necessarily refer to the same embodiment or example. In addition, the described specific features, structures, materials, or characteristics may be combined in a proper manner in any one or more of the embodiments or examples.

Although the embodiments of this application have been shown and described, a person of ordinary skill in the art should understand that various changes, modifications, replacements and variations may be made to the embodiments without departing from the principles and spirit of this application, and the scope of this application is as defined by the appended claims and equivalents thereof.

What is claimed is:

1. A battery module, comprising:

n cells, each cell having a plurality of surfaces, one of at least two of the surfaces being provided with a first positive terminal and a first negative terminal; and another one of the at least two of the surfaces being provided with a second positive terminal and a second negative terminal, wherein the n cells are arranged side by side and are connected in series, with abutting sides of adjacent ones of the n cells having a length L and a thickness T, wherein the first negative terminal of a (k−1)th cell is connected to the first positive terminal of a kth cell, the first negative terminal of the kth cell is connected to the first positive terminal of a (k+1)th cell, wherein the second negative terminal of the (k−1)th is connected to the second positive terminal of the kth cell, and the second negative terminal of the kth cell is connected to the second positive terminal of the (k+1)th cell, where 2≤k≤n−1 and n≥3; and wherein the length L and the thickness T of each of the n cells satisfy 600 mm<L≤1300 mm, and 23≤L/T≤200.

2. The battery module according to claim 1, wherein each cell has a first end surface and a second end surface, the first end surface is opposite the second end surface, the first positive terminal and the first negative terminal of the cell are provided on the first end surface, and the second positive terminal and the second negative terminal of the cell are provided on the second end surface.

3. The battery module according to claim 1, wherein each cell comprises:

a housing and a core located inside the housing, wherein the housing has a first end surface and a second end surface, the first positive terminal and the first negative terminal are provided on the first end surface, and the second positive terminal and the second negative terminal are provided on the second end surface; and wherein the core has a first end and a second end, wherein a plurality of first positive tabs and first negative tabs extend from the first end and a plurality of second positive tabs and second negative tabs extend from the second end, the first positive tabs are respectively connected to the first positive terminal, the first negative tabs are respectively connected to the first negative terminal; the second positive tabs are respectively connected to the second positive terminal, and the second negative tabs are respectively connected to the second negative terminal.

4. The battery module according to claim 3, wherein the housing of each cell further comprises a first end plate defining the first end surface and a second end plate defining the second end surface, wherein the first positive terminal and the first negative terminal are provided on and extend through the first end plate; and the second positive terminal and the second negative terminal are provided on the second end plate.

5. The battery module according to claim 4, wherein each cell comprises a core, each core comprises a plurality of sub-cores, and each of the sub-cores comprises a positive electrode plate, an insulating separator, and a negative electrode plate, the positive electrode plate is electrically connected with one of the positive tabs, and the negative electrode plate is electrically connected with one of the negative tabs; and wherein adjacent tabs in two adjacent sub-cores are located on two opposite sides in a width direction of the cell.

6. The battery module according to claim 5, wherein the plurality of sub-cores are stacked along a thickness direction of the cell; and the positive tab and the negative tab of each sub-core are staggered along the width direction of the cell.

7. The battery module according to claim 5, wherein each cell further comprises a first insulating spacer, disposed between the first end plate and the core and a second insulating spacer disposed between the second end plate and the core, the insulating spacers are configured to space the positive tab and the negative tab apart.

8. The battery module according to claim 7, wherein each insulating spacer has an isolating plate extending toward the core, and the isolating plate is disposed between the positive tabs and the negative tabs.

9. The battery module according to claim 8, wherein each cell comprises a plurality of isolating plates arranged at intervals along a direction from the positive tab to the negative tab.

10. The battery module according to claim 7, wherein each insulating spacer defines multiple avoidance holes, and wherein the positive tabs extend through avoidance holes to connect to the positive terminal and the negative tabs extend through avoidance holes to connect to the negative terminal.

11. The battery module according to claim 3, wherein the positive and negative tabs have a width H1, the positive and negative electrode plates have a width H2, and H1 and H2 satisfy $35\% \leq H1/H2 \leq 45\%$.

12. The battery module according to claim 3, wherein each electrode plate in the core comprises a current collector, at least one of the positive tab or negative tab is integrated with the current collector.

13. A power battery pack, comprising:

a battery pack casing; and the battery module according to claim 1, wherein the battery module is mounted in the battery pack casing.

14. The power battery pack according to claim 13, wherein the battery pack casing is filled with a thermally conductive insulating layer encasing the battery module.

15. A vehicle, having a power battery pack according to claim 13.

16. The battery module according to claim 2, wherein each cell comprises:

a housing and a core located inside the housing, the housing has a first end surface and a second end surface, wherein the first positive terminal and the first negative terminal are provided on the first end surface, and the second positive terminal and the second negative terminal are provided on the second end surface; and wherein the core has a first end and a second end, a plurality of first positive tabs and first negative tabs extend from the first end and a plurality of second positive tabs and second negative tabs extend from the second end, the first positive tabs are respectively connected to the first positive terminal, the first negative tabs are respectively connected to the first negative terminal; the second positive tabs are respectively connected to the second positive terminal, and the second negative tabs are respectively connected to the second negative terminal.

17. The battery module according to claim 6, wherein each cell further comprises a first insulating spacer disposed between the first end plate and the core and a second insulating spacer disposed between the second end plate and the core, the insulating spacers are configured to space the positive tab and the negative tab apart.

18. The battery module according to claim 8, wherein each insulating spacer defines multiple avoidance holes, and wherein the positive tabs extend through avoidance holes to connect to the positive terminal and the negative tabs extend through avoidance holes to connect to the negative terminal.

19. The battery module according to claim 9, wherein each insulating spacer defines multiple avoidance holes, and wherein the positive tabs extend through avoidance holes to connect to the positive terminal and the negative tabs extend through avoidance holes to connect to the negative terminal.

20. A battery module, comprising:

a first cell and a second cell, wherein a first end plate of each cell is provided with a first positive terminal and a first negative terminal, and a second end plate of each cell is provided with a second positive terminal and a second negative terminal;

wherein the two cells are arranged side by side in series, with abutting sides of adjacent ones of the n cells having a length L and a thickness T, wherein the first negative terminal of the first cell is connected to the first positive terminal of the second cell; and the second negative terminal of the first cell is connected to the second positive terminal of the second cell;

wherein each cell has a length L and a thickness T satisfying 600 mm$<L\leq$1300 mm, and 23$\times$L/T$\leq$200.

* * * * *